United States Patent
Kang et al.

(10) Patent No.: US 8,009,383 B2
(45) Date of Patent: Aug. 30, 2011

(54) SEEK CONTROL METHOD TO AVOID FLEX CABLE RESONANCE DURING SETTLE IN HARD DISK DRIVE

(75) Inventors: Chang-Ik Kang, Santa Clara, CA (US); Tao Zhang, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 36 days.

(21) Appl. No.: 12/690,703

(22) Filed: Jan. 20, 2010

(65) Prior Publication Data

US 2011/0090591 A1   Apr. 21, 2011

Related U.S. Application Data

(60) Provisional application No. 61/279,108, filed on Oct. 16, 2009.

(51) Int. Cl.
*G11B 5/596*   (2006.01)

(52) U.S. Cl. .................................. 360/78.04; 360/78.01
(58) Field of Classification Search .................. None
See application file for complete search history.

(56) References Cited

U.S. PATENT DOCUMENTS

| | | | |
|---|---|---|---|
| 7,253,989 B1 * | 8/2007 | Lau et al. | 360/78.04 |
| 7,394,614 B2 | 7/2008 | Kang | |
| 7,839,596 B2 * | 11/2010 | Shen et al. | 360/75 |
| 2004/0264035 A1 * | 12/2004 | Shioya et al. | 360/78.04 |

* cited by examiner

*Primary Examiner* — Andrew L Sniezek (57) ABSTRACT

A hard disk drive with a circuit that can perform a seek routine by providing a seek current to a voice coil motor. The voice coil motor is coupled to a head that is coupled to a disk. The seek current provides a predetermined number of harmonics. The number of harmonics is a function of a seek length of the seek routine. By way of example, the seek current may include only a first harmonic for seek lengths less than 20,000 tracks, or only the first and second harmonics for seeks less than 40,000 tracks. The harmonics can be determined by plotting PES settle versus seek length for a hard disk drive.

20 Claims, 8 Drawing Sheets

SEEK CONTROL METHOD TO AVOID FLEX CABLE RESONANCE DURING SETTLE IN HARD DISK DRIVE

REFERENCE TO CROSS-RELATED APPLICATIONS

This application claims priority to Application No. 61/279,108 filed on Oct. 16, 2009.

BACKGROUND OF THE INVENTION

1. Field of the Invention

The present invention relates to a technique for performing a seek routine in a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks. The heads are typically electronically connected to the circuits of the drive by a flex circuit.

Information is typically stored in radial tracks that extend across the surface of each disk. Each track is typically divided into a number of segments or sectors. The voice coil motor and actuator arm can move the heads to different tracks of the disks.

Figure 1:
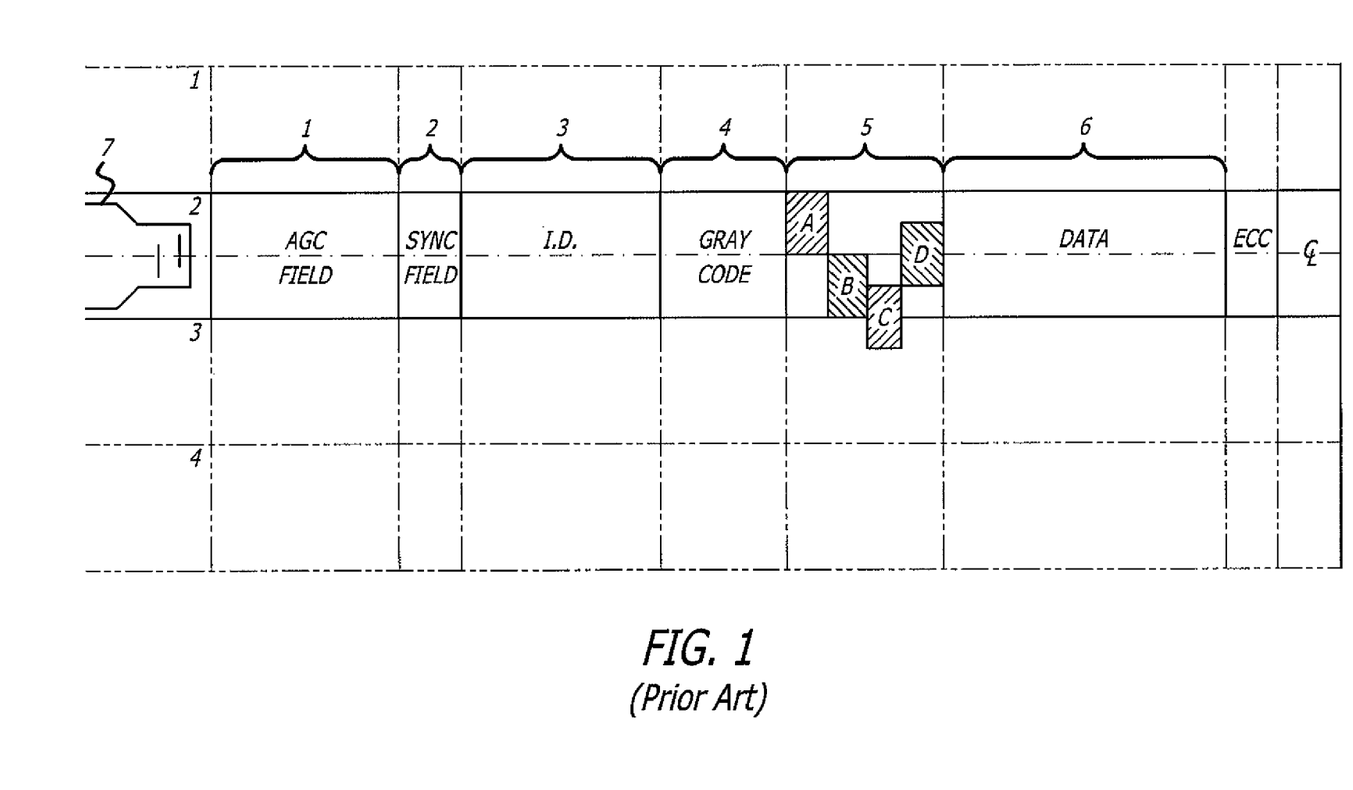
FIG. 1 is an illustration showing different fields in a track of a disk.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification, respectively.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of $((A-B)-(C-D))$ to create a position error signal ("PES"). The PES is used to create a drive signal for the voice coil motor to position the head on the track.

To move the heads to a new disk location the drive performs a seek routine by providing a control signal to the voice coil motor. In a seek routine the heads are moved across the disks and then decelerated into a settle mode. During the settle mode there may be a disturbance in the flex circuit that increases the settle time of the servo process. The disturbance may include a biasing force and/or a resonance that is exerted onto the actuator arm by the flex circuit. There are various approaches for compensating the flex circuit disturbances. For example, the integrator state of the controller can be read during on-track mode. Another approach that utilizes a state predictor is disclosed in U.S. Pat. No. 7,394,614 issued to Kang and assigned to Samsung Electronics Corp., Ltd.

BRIEF SUMMARY OF THE INVENTION

A hard disk drive with a circuit that can perform a seek routine by providing a seek current to a voice coil motor. The voice coil motor is coupled to a head that is coupled to a disk. The seek current provides a predetermined number of harmonics. The number of harmonics is a function of a seek length of the seek routine.

DETAILED DESCRIPTION

Disclosed is a hard disk drive with a circuit that can perform a seek routine by providing a seek current to a voice coil motor. The voice coil motor is coupled to a head that is coupled to a disk. The seek current provides a predetermined number of harmonics. The number of harmonics is a function of a seek length of the seek routine. By way of example, the seek current may include only a first harmonic for seek lengths less than 20,000 tracks, or only the first and second harmonics for seeks less than 40,000 tracks. The harmonics can be determined by plotting PES settle versus seek length for a hard disk drive.

Figure 2:
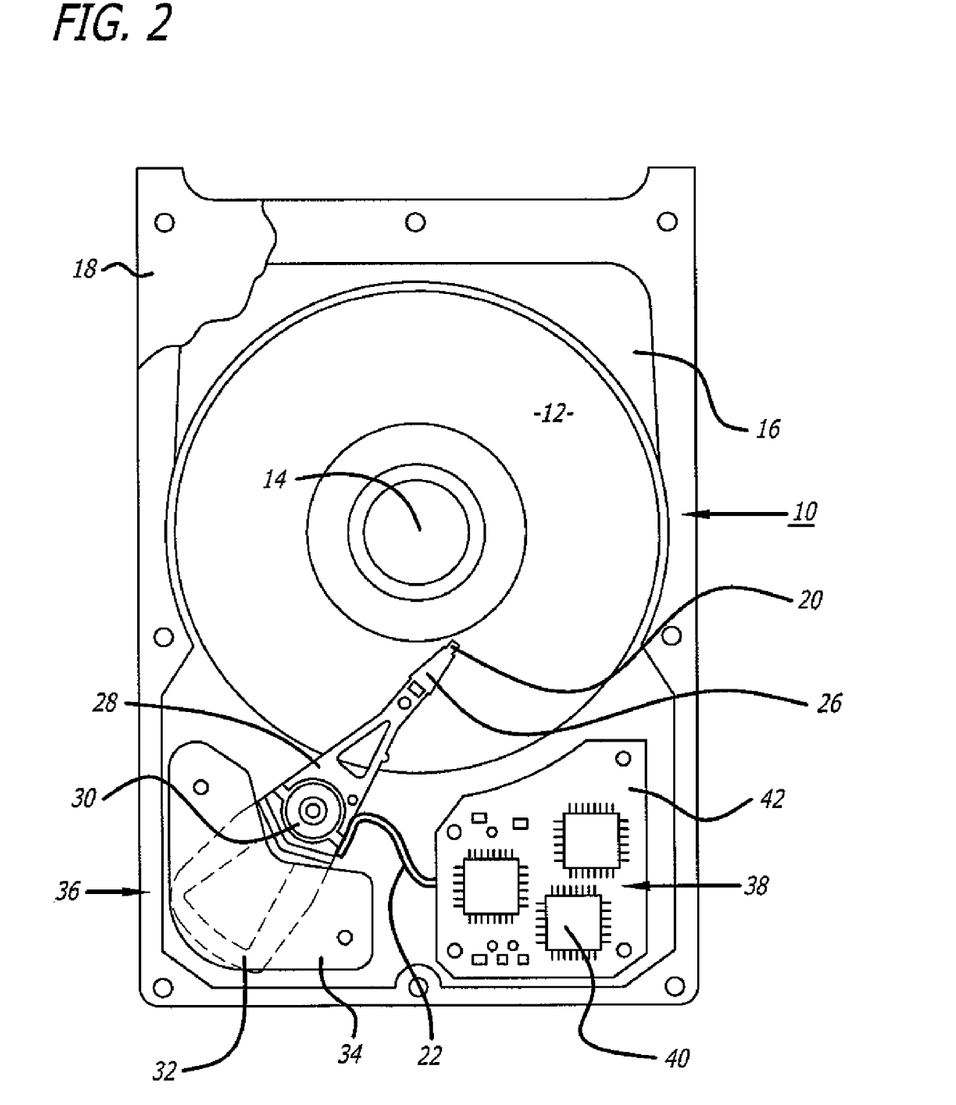
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux. Each head is connected to a flex circuit 22. The flex circuit 22 provides an electrical connection between the head 20 and the electrical circuits of the drives.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
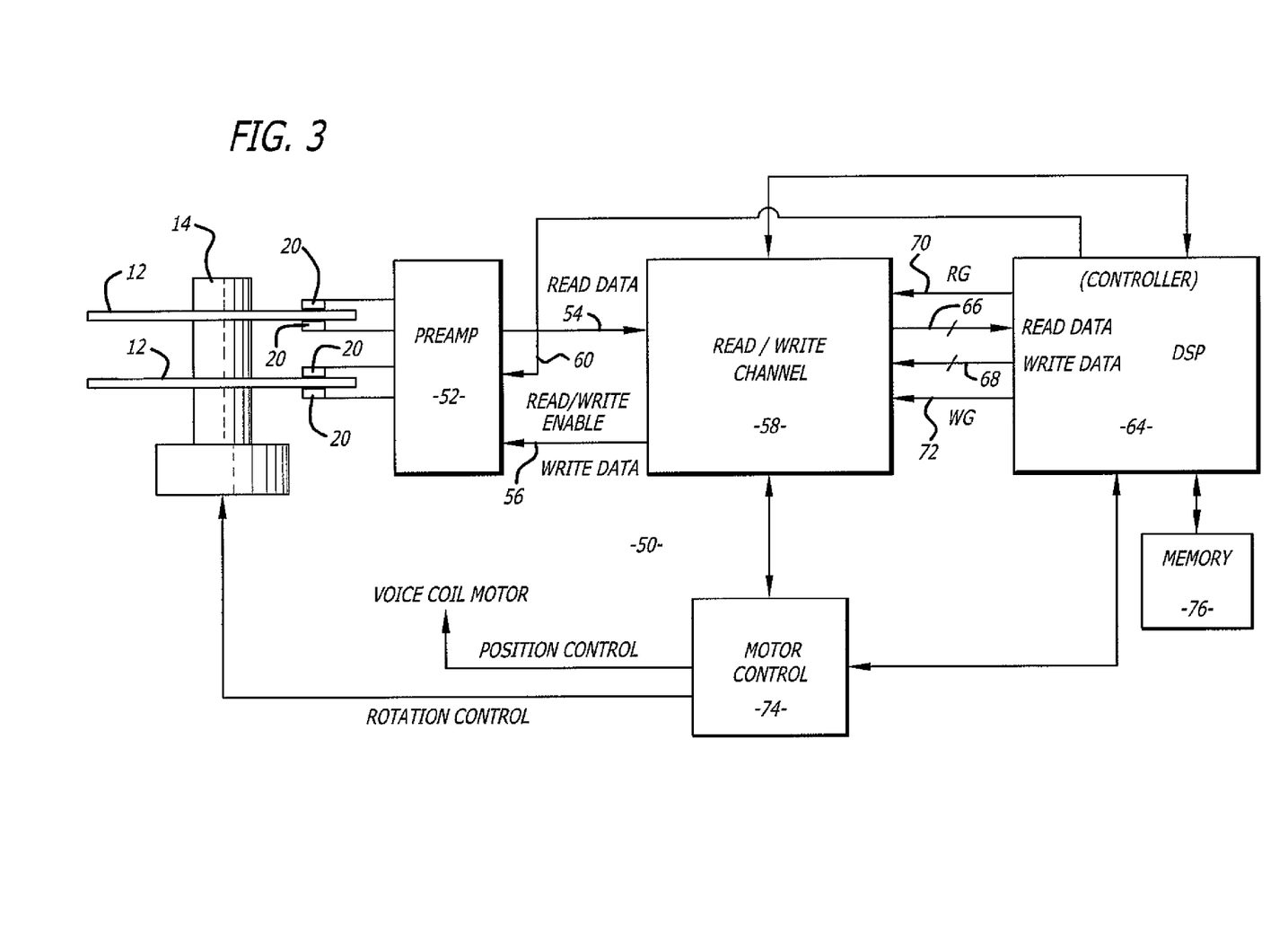
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

The controller 64 may also operate a seek routine to move the heads to different tracks of the disks. The seek routine includes providing a seek current to the voice coil motor to move the actuator arm and heads.

Figure 4:
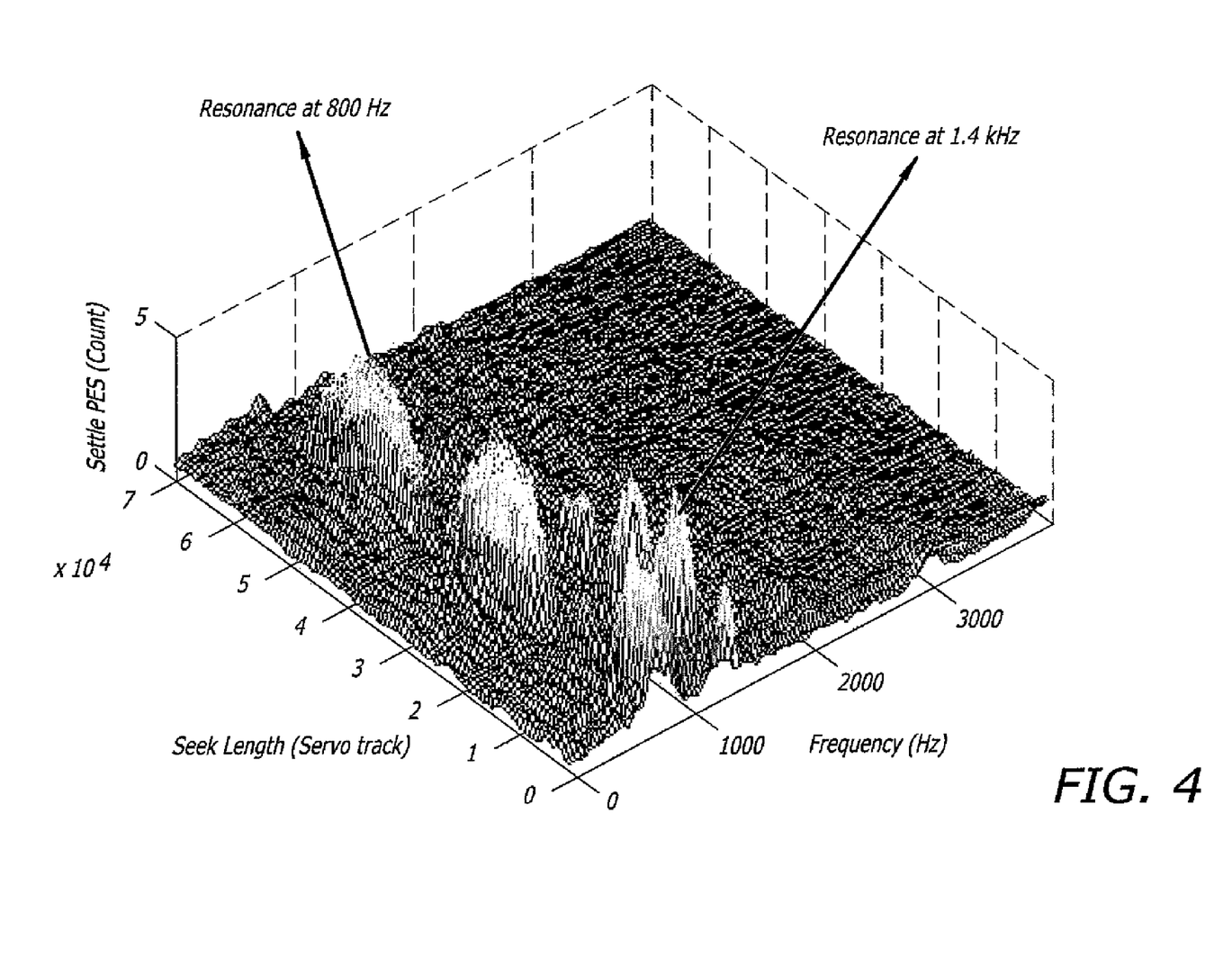
FIG. 4 is a plot of PES settle versus seek length at different frequencies.

FIG. 4 shows a plot of PES settle versus seek length at different head settling frequencies. As shown by FIG. 4 there are two distinct resonant frequencies at 800 and 1.4 KHz. It is believed that these resonant frequencies are caused by resonance in the flex circuit.

Figure 5:
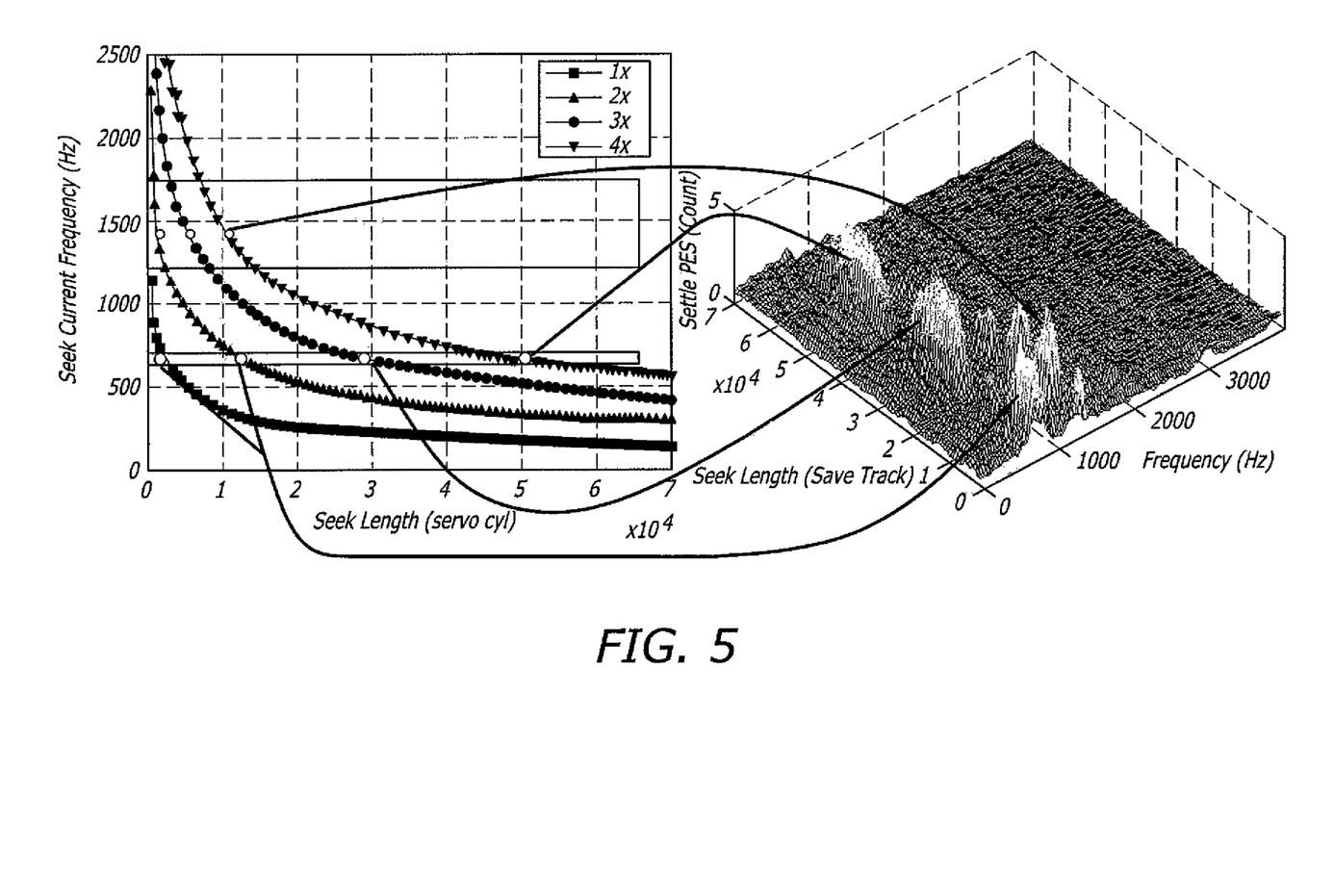
FIG. 5 is a plot of seek current frequency versus seek length.

FIG. 5 is a plot that shows the seek current frequency versus seek length, with the first 1×, second 2×, third 3× and fourth 4× frequency components of the seek current. Lines corresponding to the resonant frequencies of 800 and 1.4 KHz are superimposed onto the plot. The 4× seek current frequency component has a resonance contribution of 800 Hz at approximately a 50K track seek length. The 3× frequency component contributes to a 800 Hz resonance at about a 30K track seek length. The 2×, 3× and 4× frequency components contribute to a 1.4 KHz resonance at seeks of less than 20K tracks.

Figure 6:
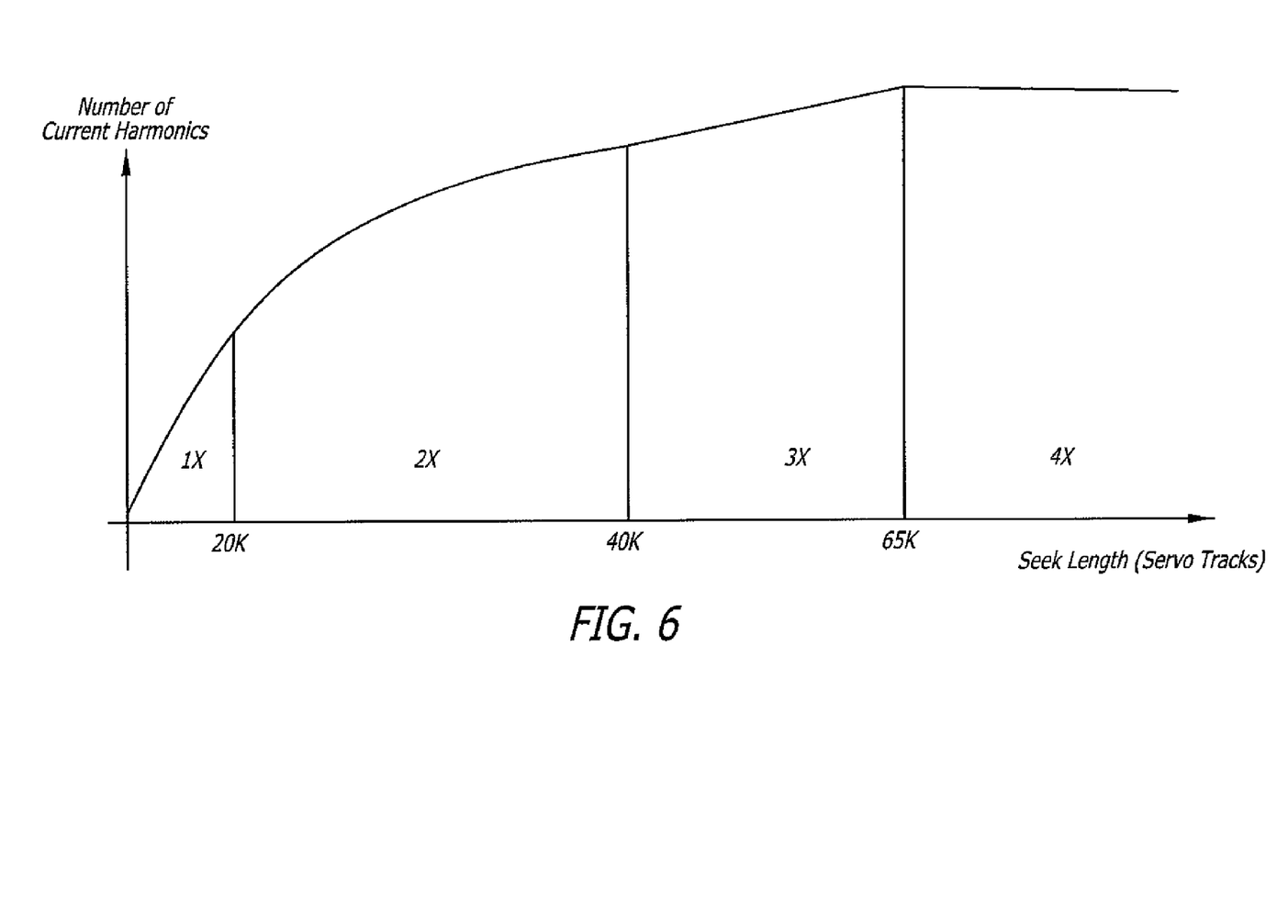
FIG. 6 is a graph showing a selection of seek current frequencies as a function of seek length.

To reduce settle time the controller provides a seek current that does not include seek current harmonics that would contribute to flex circuit resonance. FIG. 6 is a graph showing the selection of seek current frequencies as a function of seek length. For example, for seeks less than 20K tracks, the seek current only includes the first harmonic. For seeks greater than 20K and less than 40K tracks, just the first 1× and second 2× harmonics are used. The first 1×, second 2× and third 3× harmonics are utilized for seeks greater than 40K and less than 65K tracks. For seeks greater than 65K tracks, all of the seek current harmonics are provided to the voice coil motor because none of the harmonics contribute to flex circuit resonance.

Figure 7A:
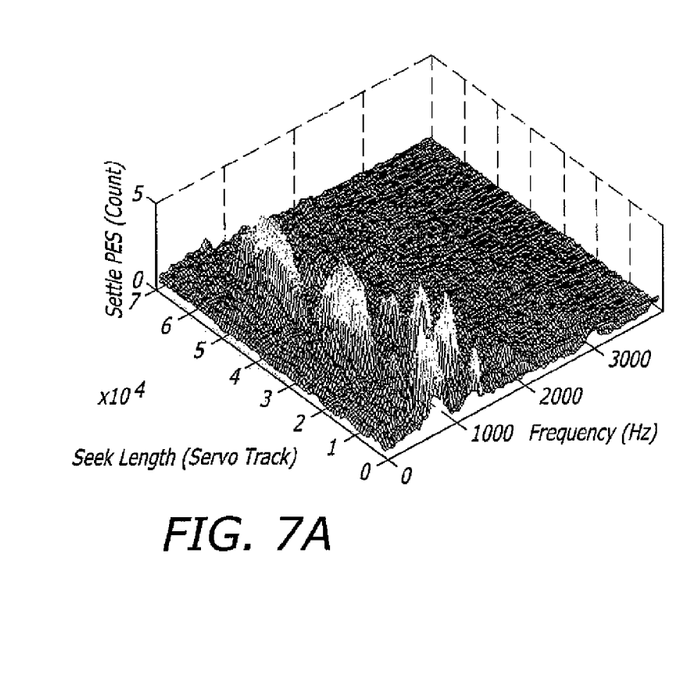
FIG. 7 is a plot of PES settle for a hard disk drive that has and does not have resonance avoidance.
Figure 7B:
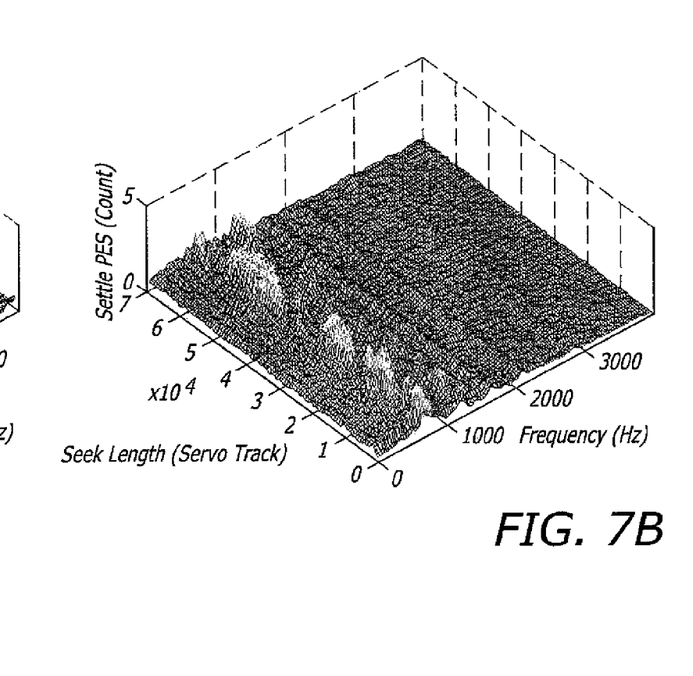
Figure 8:
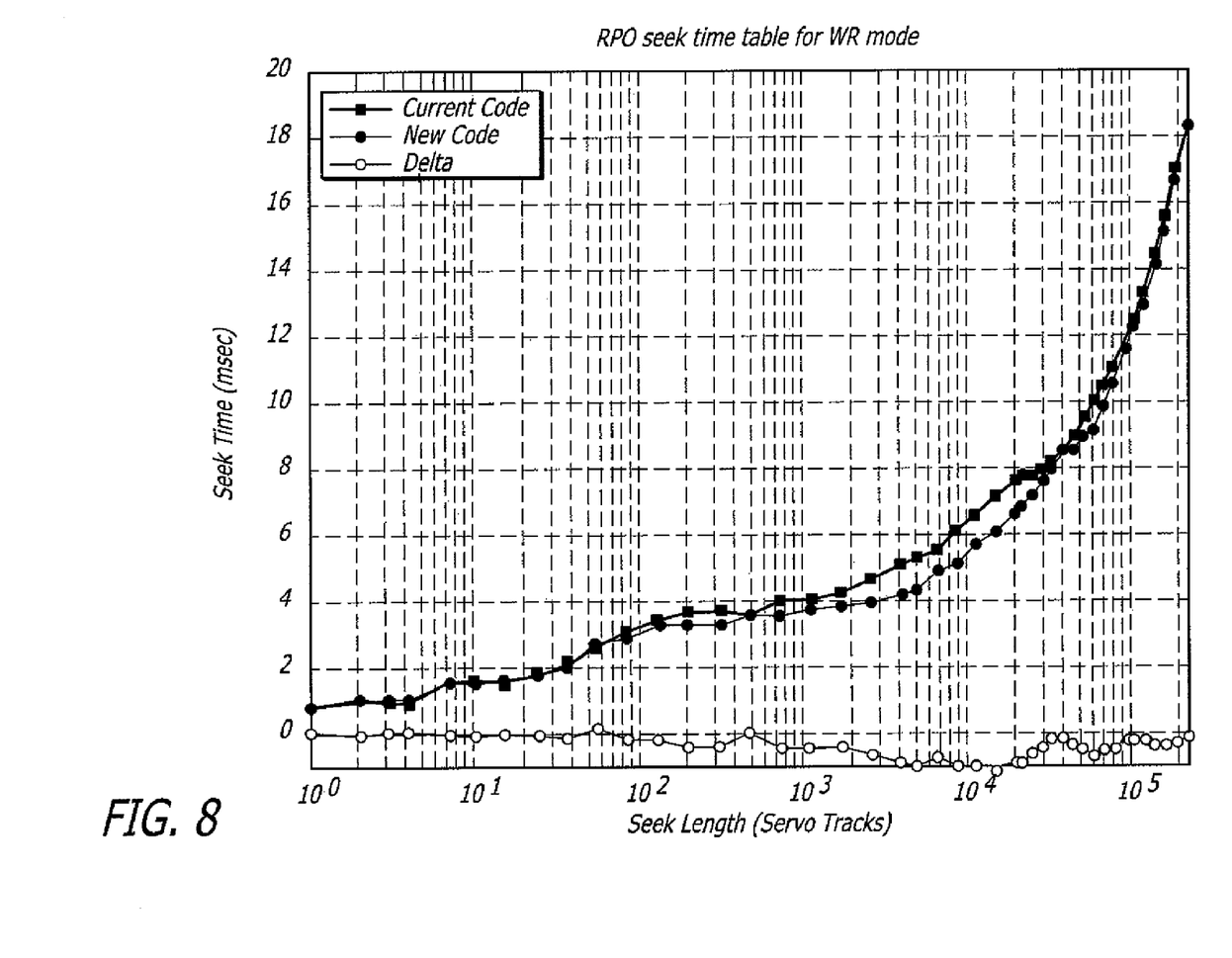
FIG. 8 is a graph showing seek time for a hard disk drive that has and does not have resonance avoidance.

FIG. 7 are plots showing PES settle for a drive with and without resonance avoidance. It can be seen that the PES settle is reduced with resonance avoidance. This reduces the probability of off-track write. The reduction in PES settle also reduces the overall seek time. FIG. 8 is a graph showing seek time for a drive with and without resonance avoidance. By way of example, the resonance avoidance technique can reduce seek time by 0.5 msec.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk;
a spindle motor that rotates said disk;
an actuator arm;
a head coupled to said actuator arm and said disk;
a voice coil motor that is coupled to said actuator arm; and,
a circuit that can perform a seek routine by providing a seek current to said voice coil motor, said seek current provides a predetermined number of harmonics, the number of said harmonics is a function of a seek length of said seek routine.

2. The disk drive of claim 1, wherein said seek current includes only a first harmonic for a seek length less than a first value.

3. The disk drive of claim 2, wherein said seek current includes only said first harmonic and a second harmonic for a seek length less than a second value.

4. The disk drive of claim 3, wherein said seek current includes only said first and second harmonics and a third harmonic for a seek length less than a third value.

5. The disk drive of claim 4, wherein said first value is 20,000 tracks, said second value is 40,000 tracks and said third value is 65,000 tracks.

6. The disk drive of claim 1, further comprising a flex circuit coupled to said actuator arm, and wherein said harmonics are selected to avoid a flex circuit resonance.

7. A hard disk drive, comprising:
a disk;
a spindle motor that rotates said disk;
an actuator arm;
a head coupled to said actuator arm and said disk;
a voice coil motor that is coupled to said actuator arm; and,
seek means for performing a seek routine by providing a seek current to said voice coil motor, said seek current provides a predetermined number of harmonics, the number of harmonics is a function of a seek length of said seek routine.

8. The disk drive of claim 7, wherein said seek current includes only a first harmonic for a seek length less than a first value.

9. The disk drive of claim 8, wherein said seek current includes only said first harmonic and a second harmonic for a seek length less than a second value.

10. The disk drive of claim 9, wherein said seek current includes only said first and second harmonics and a third harmonic for a seek length less than a third value.

11. The disk drive of claim 10, wherein said first value is 20,000 tracks, said second value is 40,000 tracks and said third value is 65,000 tracks.

12. The disk drive of claim 7, further comprising a flex circuit coupled to said actuator arm, and wherein said harmonics are selected to avoid a flex circuit resonance.

13. A method for moving a head relative to a disk of a hard disk drive in a seek routine, comprising:

providing a seek current to a voice coil motor to move a head relative to a disk, the seek current provides a predetermined number of harmonics, the number of harmonics being a function of a seek length of a seek routine.

14. The method of claim 13, wherein the seek current includes only a first harmonic for a seek length less than a first value.

15. The method of claim 14, wherein the seek current includes only the first harmonic and a second harmonic for a seek length less than a second value.

16. The method of claim 15, wherein the seek current includes only the first and second harmonics and a third harmonic for a seek length less than a third value.

17. The method of claim 16, wherein the first value is 20,000 tracks, the second value is 40,000 tracks and the third value is 65,000 tracks.

18. The method of claim 13, wherein said harmonics are selected to avoid a flex circuit resonance.

19. A method for selecting one or more seek current frequencies for a seek routine used to move a head relative to a disk of a hard disk drive, comprising:
    plotting a first plot that includes a PES settle versus seek length at different head settling frequencies;
    determining one or more resonant frequencies from the first plot that correspond to flex circuit resonance;
    plotting a second plot that includes a seek current frequency versus a seek length with a plurality of harmonics, the second plot including the one or more resonant frequencies determined from the first plot; and,
    selecting one or more seek current frequencies that are a function of seek length and avoids the one or more resonant frequencies that correspond to flex circuit resonance.

20. The method of claim 19, wherein the resonant frequencies are at 800 and 1400 Hertz.

* * * * *